3,531,399
ANNULAR FLOW CONTACTING SYSTEM
Norman L. Carr, Allison Park, Pa., assignor to Gulf Research & Development Company, Pittsburgh, Pa., a corporation of Delaware
Filed Mar. 6, 1968, Ser. No. 710,978
Int. Cl. C10g *19/00, 31/00*
U.S. Cl. 208—230          6 Claims

ABSTRACT OF THE DISCLOSURE

Continuous contacting of fluids is conducted under annular flow conditions with a centrally-provided fluid jet-injected stream being surrounded by a parallel, coaxial fluid stream that is relatively immiscible with the jet-injected fluid stream.

---

This invention relates to a process for immiscible fluid phase contacting and apparatus for conducting such a process. More particularly, this invention relates to a continuous liquid-liquid phase caustic treating process for sour hydrocarbon distillates and to apparatus for carrying out the process.

Various methods and means have been devised for contacting two or more fluids, for example, for bringing about a chemical reaction between the reacting fluid phases. It has been commonly considered that the more intimately and turbulently that the reacting phases are intermixed, the higher will be the degree of reaction or conversion. For example, petroleum distillate oils, particularly catalytically cracked gasolines which are frequently unmarketable when they contain as little as a few thousandth percent mercaptan sulfur, have been intimately contacted with caustic soda for the removal of the mercaptan sulfur. Thus, the sour hydrocarbon and the caustic soda are turbulently brought together in a stirred tank reactor using high turbine speeds for a period of at least 12 to 15 seconds, in order to attain the desulfurization reaction equilibrium.

Various other mixing means have been proposed for the purpose of intimately contacting two or more fluids, which rely on the turbulent intermixture induced by fluid flow constrictions. Accordingly, devices such as venturi-shaped chambers, baffles, small valve openings, etc. have been employed to effect intimate contact between fluids undergoing reaction. These devices have been especially designed for the purpose of causing as much turbulence as possible between the reacting fluid streams. The energy requirements for the foregoing reactors are high because of the increased friction of flow induced by the flow constrictive devices.

It has now been found that reactions between relatively immiscible fluid phases may be continuously, rapidly, completely and effectively conducted without the need for lengthy and excessively turbulent contact between the reacting fluid phases. According to the present invention, an annular flow reaction zone is provided for conducting fluid-fluid phase reactions in which a first fluid stream is injected into the reaction zone under pressure in the form of a jet, while a second fluid, which is relatively immiscible with the first fluid, is introduced into the reaction zone under pressure in parallel, coaxial relationship with respect to the first fluid stream. Each of the fluid streams passes through the reactor under substantially annular flow-type conditions with reaction between the streams substantially taking place at the boundary between the streams.

Unexpectedly, it has been found that a substantially instantaneous reaction takes place between the reacting immiscible fluid phases in the annular reaction zone of the present invention. Thus, relatively long and excessive turbulent intermixing of the reacting phases is not required for successful operation. The term "annular flow" as used herein may be defined as concurrent fluid flow wherein a first annular fluid flows in a layer or film along the inside wall of the reactor and a second fluid flows as a central or core fluid within the first annular fluid. Each of the individual fluid streams flow in a turbulent manner through the reaction zone with the annular fluid stream and the central core fluid stream each possessing a high Reynolds number and high local shear. However, there is essentially no turbulent intermixture between the respective fluid phases.

The annular reaction zone of the present invention may be defined, for example, by the inner wall of a cylindrical tube. Disposed coaxially within a portion of such cylindrical tube is a jet tube. The length of the cylindrical tube form the terminal point of the jet tube downstream to the end of the cylindrical tube represents the length of the zone wherein the two immiscible fluids are contacted. The relative size of the reaction zone may be represented by the following ratios:

$$d/D$$

wherein $(d)$ is the inner diameter of the jet and $(D)$ is the inner diameter of the cylindrical tube; and $$L = nD$$

wherein $(L)$ equals the length of the cylindrical tube from the terminal point of the jet to the end of the tube and $n$ is the number of diameters $(D)$.

The value of the ratio, $d/D$, is in the range of between about 0.1 and about 0.9, preferably in the range of between about 0.3 and about 0.6. The value of $n$ is in the range of between about 1 and about 100, preferably in the range of between about 5 and about 10. An especially preferred value of $n$ is about 10.

The flow pattern of the jet-injected core stream and that of the parallel, coaxial annular stream that flows along the inside wall of the cylindrical tube is that of turbulent, rather than laminar flow. However, there is no turbulent intermixing of the respective streams as they pass through the reactor.

In order to maintain "annular flow-type" conditions in the reactor, a sufficiently high flow rate must be maintained for each of the immiscible fluid streams. Suitable velocities for the central or core fluid that is introduced by the jet are, for example, in the range of between about 10 and about 100 feet per second based upon the total cross-section of the circular tube, i.e. the annular reaction zone. Suitable velocities for the annulus fluid are, for example, in the range of between about 0.1 and about 10 feet per second based upon the total cross-section of the circular tube. Preferably, the ratio of the velocity of the annulus fluid to the velocity of the core fluid is in the range of between about 0.05:1 and about 0.8:1. It is essential to the success of the present invention that the core fluid have a higher flow rate than the annulus fluid.

Thus, the present invention provides a means for conducting a continuous reaction between immiscible fluid phases wherein the apparatus employed is much smaller than that previously used for such reactions, e.g., a stirred reactor, and thus requires less space. Additionally, the present apparatus contains no moving parts and is therefore less complicated and less expensive than prior reactors. Furthermore, since the fluid phases of the present invention are contacted under annular flow conditions with no turbulent intermixture between streams, there is less fluid friction involved and therefore lower energy requirements for conducting the process. The absence of stirrers, baffles and flow-constricting devices also reduces the energy requirements.

The invention will be further illustrated by reference to the accompanying drawing. The description will be related to the liquid-liquid phase caustic treatment of a sour hydrocarbon distillate for the purposes of illustration. However, the present invention is equally applicable to gas-liquid contact, so long as the fluids involved are relatively immiscible in one another.

In the drawings, FIG. 1 is a schematic, simplified flow diagram of an annular flow reaction process;

Figure 1:
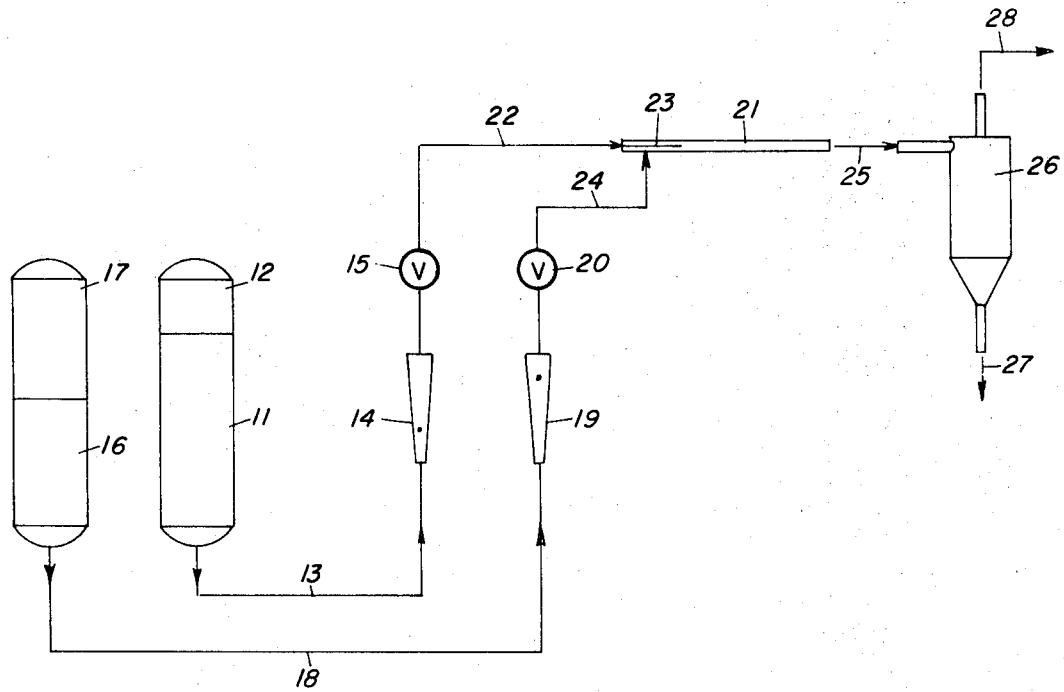

Referring to FIG. 1 of the drawings, a sour gasoline feed stock 11 containing between about 250 and about 1400 parts per million of mercaptan sulfur is discharged from a pressurized feed tank 12 by means of the flow conduit 13. The sour hydrocarbon is passed through a rotameter 14 and a valve 15 by means of which the flow rate of the feed is controlled. Concurrently, a 10 percent solution of caustic soda 16 is discharged from the pressurized vessel 17 into the line 18 by means of which it is conducted through rotameter 19 and flow control valve 20.

It is recognized, of course, that FIG. 1 is schematic and greatly simplified. Therefore, many necessary pieces of equipment, such as valves, pumps, controls, etc., necessary for efficient commercial operation are not shown.

The first fluid phase, i.e. the sour hydrocarbon feed, is introduced into the center portion of the annular flow reactor 21 by means of the line 22 and a centrally-disposed jet 23 in the liquid phase at a velocity of between about 10 and about 100 feet per second, preferably between about 30 and about 100 feet per second, based upon the total cross-section of the cylindrical-shaped reactor. Meanwhile, the caustic stream is introduced into a peripheral portion of the annular flow reactor by means of a line 24.

The caustic stream may be introduced into the reactor 21 by any suitable means including a radial or tangential inlet or inlets. Likewise, an inlet or plurality of inlets that are parallel to the axis of the reactor may be employed. This stream is caused to flow in the annulus defined by the inner wall of the reactor 21 and the outer wall of the jet 23. The annular caustic stream takes the shape of a hollow cylinder and is coaxially disposed about the centrally-disposed hydrocarbon jet inlet means. The annular fluid, the caustic stream, flows along the inner wall of the reactor 21 at an annular velocity, for example, of between about 0.1 and about 10 feet per second, preferably between about 5 and about 10 feet per second based upon the total cross-section of the cylindrical-shaped reactor.

Advantageously, the ratio of the velocity of the annular fluid to the velocity of the core fluid is in the range of between about 0.05:1 and about 0.8:1. Preferably, the more dense fluid is employed as the annular layer adjacent the reactor wall, while the less dense fluid is provided as the central core. Thus, the less dense hydrocarbon stream is illustrated as being the central liquid stream and the more dense caustic stream is introduced into reactor 21 as the surrounding stream. However, either the more dense or less dense fluid may be employed as the core fluid, so long as the core fluid is passed at a higher flow rate than the annular fluid through the reaction zone.

The removal of mercaptan sulfur from hydrocarbon by caustic treatment may be represented by the following reactions and equilibria; which occur at the hydrocarbon-caustic interface:

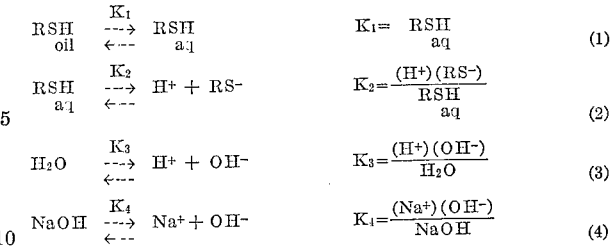

The dynamic reaction taking place between the reacting phases is substantially instantaneous so that the reactor 21 may be relatively short. Suitable contact times include, for example, between about 0.001 and about 10 seconds, preferably between about 0.001 and about 0.1 second.

The conditions employed in the annular flow reactor 21 may be varied over a wide range depending, of course, upon the particular reaction involved. Thus, any suitable temperature and pressure may be employed so long as the liquid phase conditions are maintained in the reactor in the case of caustic sweetening. A pressure drop is experienced across the annular reactor and this pressure drop based upon a reactor discharge at atmospheric pressure will ordinarily be in the range of between about one and about 50 p.s.i. preferably between about 5 and about 10 p.s.i. depending upon the diameter of the jet 23, the feed rates of the liquid streams, and the length of the annular tube.

Figure 2:
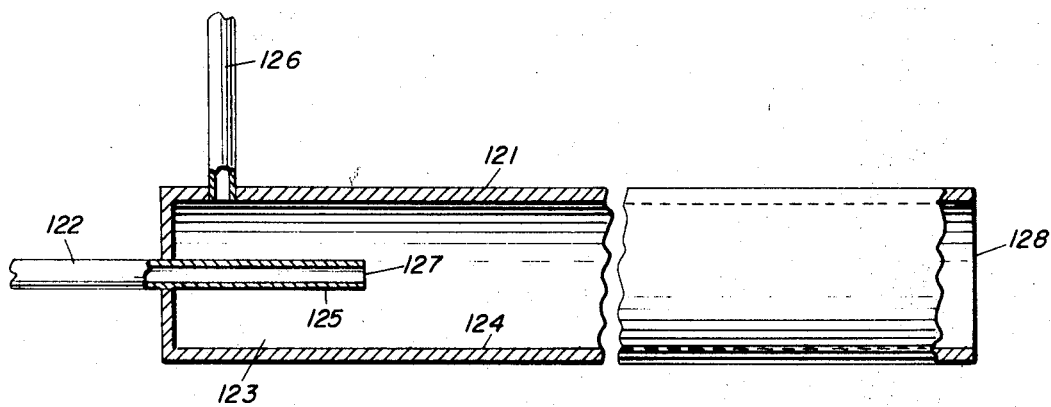
FIG. 2 is an elevational view in section of an annular flow reactor through its axis.

FIG. 2 illustrates an annular flow reactor of the present invention wherein the reactor comprises a cylindrical shaped annular flow tube 121 having a coaxially-disposed jet tube 122 provided for the introduction of the high flow rate fluid core stream. A second fluid is introduced into the annular space 123 between the inside wall 124 of the reactor and the outside wall 125 of the jet tube 122 by means of the radial inlet 126. The length of the reaction zone is the reactor 121 is the distance from the end 127 of the jet tube 122 to the end 128 of the reactor 121.

As previously mentioned, the length (L) of the reaction zone is suitably within the range of between about one and about 100 diameters (D). In FIG. 2, the diameter (D) would be the diameter of the cylinder formed by the inside wall 124. Likewise, the ratio of the inside diameter $(d)$ of the jet tube 122 to (D), viz, $d/D$, is suitably between about 0.1 and about 0.9.

Referring again more particularly to FIG. 1 of the drawing, the desulfurized hydrocarbon and caustic are withdrawn from the reactor 21 by means of the line 25 and are introduced into a suitable separatory vessel, such as a settling tank, or the cyclone separator 26. A vertical flow pattern is induced upon the treated hydrocarbon liquid in the separator by virtue of the design of the cyclone and the natural tendency of the hydrocarbon and caustic phases to separate is therein amplified. A liquid caustic phase is discharged from the cyclone by means of the line 27 while a sweetened hydrocarbon product phase containing between about 8 and about 75 parts per million mercaptan sulfur is withdrawn from the cyclone by means of the line 28.

Thus, it may be seen that the present invention provides a contacting means for immiscible fluid phase reactions wherein the apparatus is uncomplicated, viz, involves no moving parts; permits a high reaction rate; requires less space; requires less energy of operation; and provides a highly effective process for contacting two reacting fluids.

The invention will be further illustrated by the following non-limiting examples.

EXAMPLES 1 TO 10

An arrangement similar to that depicted in FIG. 1 is employed in the present examples. A pentane feed containing about 0.2 percent by weight ethyl mercaptan is fed to an annular flow reactor at calibrated rates from a propane pressurized cylinder, which is pressurized to 80 p.s.i.g. An aqueous caustic solution comprising 10 percent sodium hydroxide is also metered from an 80 p.s.i.g. propane cylinder. The liquid streams are fed to the reactor at a hydrocarbon-to-caustic volume ratio of 4 to 1.

An annular flow reactor comprising precision bore glass capillary tubing having a ⅛ inch inner diameter is employed. The hydrocarbon stream is discharged from a jet having a 1/16 inch inner diameter into the annular reactor at pressures up to 32 p.s.i.g., while the caustic enters the reactor from the annulus surrounding the hydrocarbon jet.

For purposes of comparison, the feed rates and reaction times are varied. Reactor lengths of various sizes are employed. Reaction rate constants are determined from the change in mercaptan sulfur between the feed and product hydrocarbon streams. Caustic extracts of the hydrocarbon samples from the feed and product streams are tested for mercaptan sulfur analysis by a potentiometric procedure. The mercaptan-containing caustic sample is dissolved in dilute caustic solution and titrated potentiometrically with silver nitrate solution with two equivalence points, representing sulfide sulfur and mercaptan sulfur. As an indicator, the potential between a saturated calomel reference electrode and a silver sulfide indicator electrode is employed.

The mercaptan content of the hydrocarbon is determined by an automatic potentiometric method. The range of the method extends down to mercaptan sulfur values as low as 0.5 p.p.m. The sample is dissolved in an alcoholic solution of sodium acetate and automatically titrated to the equivalence point with an alcoholic solution of silver nitrate. As an indicator, the potential between a glass reference electrode and a silver indicator electrode is employed.

A Beckman Model K automatic titrator is employed in the foregoing tests.

The reaction rate constants are calculated using the following equations:

$$\frac{C-C_e}{C_o-C_e} = e^{-k\theta\phi}$$

or $$k = \frac{1}{\theta\phi} \ln \frac{C_o-C_e}{C-C_e}$$

where:

$k$: overall rate constant, sec.$^{-1}$
$\theta$: time, defined at $V_T/F_T$
  $V_T$ = reactor volume, milliliters
  $F_T$ = total feed, milliliters per second
$\phi$: volume fraction of hydrocarbon in total feed
$C$: concentration of mercaptan sulfur: wt./wt.
  $C_o$: initial value
  $C_e$: equilibrium value The results of the runs are set forth in Table 1, below:

The comparative results of Examples 1 to 10 indicate shorter reaction times are more effective in mercaptan sulfur removal from hydrocarbons by caustic treatment in terms of energy requirements. Thus, mercaptan sulfur is removed from the pentane effective in six milliseconds. Additionally, the results indicate that more efficient mercaptan sulfur removal is obtained as the reaction time is reduced by increasing the feed rates while employing the same size reactor.

Figure 3:
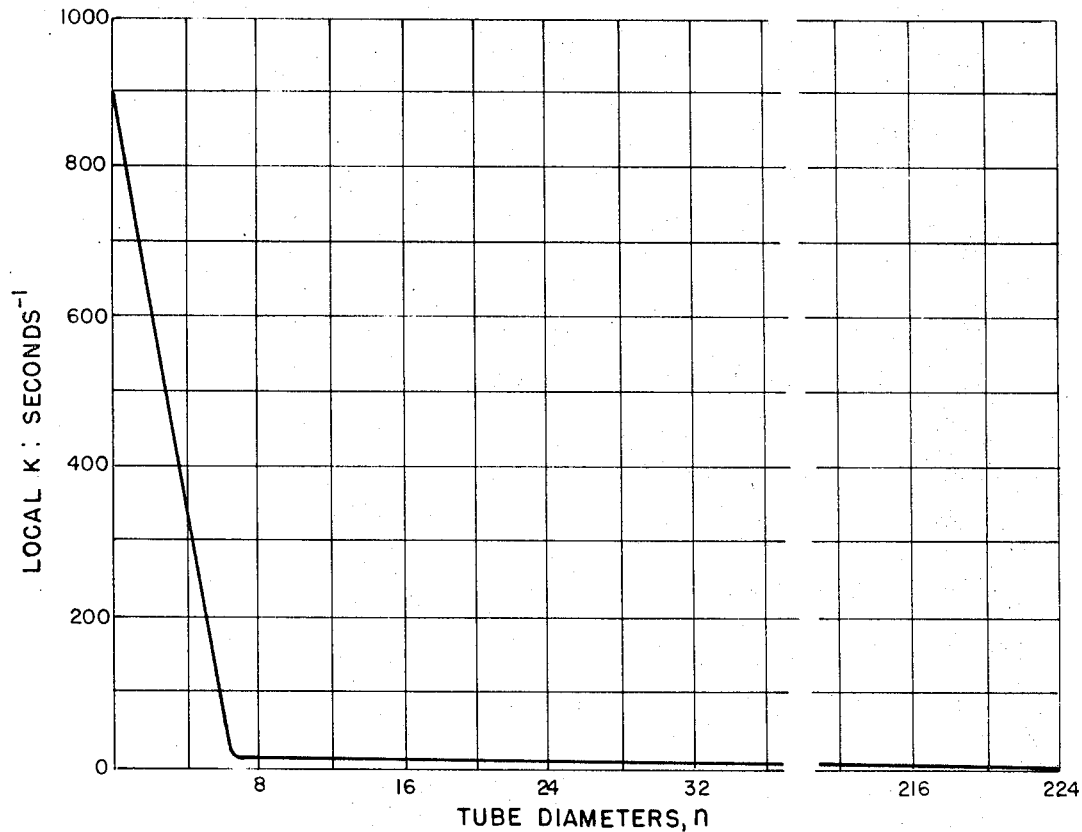
FIG. 3 is a graph illustrating the change in local reaction rate constant for caustic sweetening as a function of annular reactor length.

Based upon the results obtained in Table 1 for a total feed rate of 1450 milliliters per minute, a curve is generated to illustrate the effect of reactor length on point reaction rate constants. This curve is shown in FIG. 3. Upon viewing FIG. 3, the initial slope of the curve indicates that virtually all of the desulfurization reactions are completed in the initial portion of the ⅛ inch diameter reactor or in about one inch, i.e. $n=8$, of annular reactor length. Beyond this portion, the average reaction rate constant is so low that lengthening the reactor or using increased reaction times does not contribute significantly to reactor performance. In fact, the energy expended increases with reactor length. This loss is apparently due to the friction losses involved when longer reaction zones are employed.

Thus, FIG. 3 clearly illustrates that if the reactor length is too short, incomplete mercaptan removal (reaction) will take place; while if the reactor is too long, complete removal will take place but excessive pressure drops and energy requirements will be involved. As seen upon viewing FIG. 3, the optimum reactor length for the mercaptan removal is about 10 tube diameters, i.e. $n=10$. Such optimum results correspond to extremely high local rate constants, while obtaining such results with a minimum output of energy.

The following example is for comparative purposes and illustrates the performance of the present reactor with respect to a conventional stirred reactor.

EXAMPLE 11

The feed stock of the previous examples is passed to a stirred reactor. The stirred reactor is operated at a moderately high degree of mixing. The range of power inputs is from 0.6 to 60 horsepower per 100 gallons of reactor volume.

The reaction rate constant in the case of the stirred reactor is calculated by means of the following equation:

$$k = \frac{1}{\theta\phi} \times \frac{(C_o-C)}{(C-C_e)}$$

wherein the foregoing symbols are defined as before.

Figure 4:
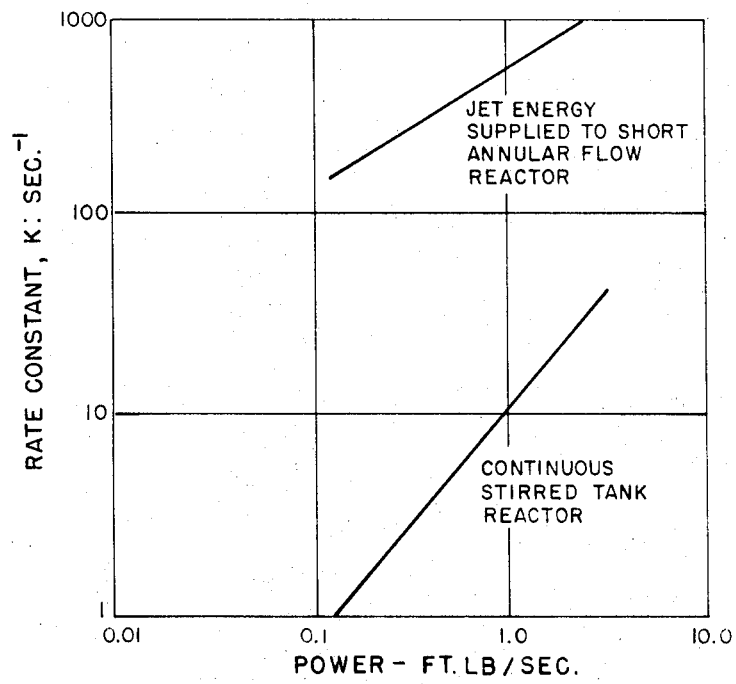
FIG. 4 is a graph illustrating the comparative energy requirements of an annular reactor and a stirred reactor for various mercaptan removal rate constants.

The results are graphically illustrated in FIG. 4. Sweetening reaction equilibrium in the case of the stirred reactor is obtained in 12 to 15 seconds nominal reaction time employing a high turbine speed with the annular flow reactor feed rates being 2.5 to 10 times that employed in the stirred reactor. As seen in FIG. 4, the reaction rate constants obtained with the annular flow reactor are 30 to 150 times higher than those obtained with the stirred reactor at comparable energy inputs and

TABLE 1.—CONCENTRATION OF MERCAPTAN SULFUR IN PENTANE

| Example No. | Reactor length, inches | Nominal reaction time, seconds | Total feed rate, ml./min. | Feed, p.p.m. | Product, p.p.m. | Equilibrium, p.p.m. | Percent of equilibrium | Reaction rate constant k, sec.$^{-1}$ | Energy [1] requirements, ft.-lb./sec. |
|---|---|---|---|---|---|---|---|---|---|
| 1 | 28¾ | 0.240 | 1,450 | 1,100 | 75 | 30 | 95.8 | 16.5 | 1.16 |
| 2 | 28¾ | 0.160 | 2,175 | 1,100 | 40 | 30 | 99.0 | 36.5 | 6.31 |
| 3 | 28¾ | 0.120 | 2,900 | 1,100 | 30 | 30 | 100 | | 8.18 |
| 4 | 14¾ | 0.121 | 1,470 | 1,230 | 73 | 33 | 96.6 | 34.1 | 1.07 |
| 5 | 14¾ | 0.091 | 1,960 | 1,230 | 33 | 33 | 100 | | 2.23 |
| 6 | 14¾ | 0.065 | 2,740 | 1,230 | 33 | 33 | 100 | | 7.59 |
| 7 | 14¾ | 0.042 | 4,260 | 1,230 | 33 | 33 | 100 | | |
| 8 | ¾ | 0.0062 | 1,450 | 290 | 38 | 8 | 89.4 | 454 | 0.63 |
| 9 | ¾ | 0.0047 | 1,915 | 290 | 23 | 8 | 94.8 | 838 | 1.83 |
| 10 | ¾ | 0.0031 | 2,930 | 290 | 8 | 8 | 100 | | 6.27 | volumetric flow rates. Considerably less energy is required in the case of the annular flow reactor to achieve comparable rate constants.

Thus, the present invention provides a high speed, low energy requirement means of conducting liquid-liquid phase reactions in addition to requiring less space and being less complicated than prior means that have been employed for such reactions. While the present invention has been illustrated with respect to the removal of mercaptan sulfur from sour hydrocarbons with caustic soda, it may also be employed for conducting other liquid-liquid phase reactions. For example, it may be employed in the nitric acid oxidation of hydrocarbons; oxidation of methane to methanol; alkylation of olefins, and the like.

As previously mentioned, the process of the present invention can be utilized for reacting relatively immiscible fluids and is not restricted to the contact between relatively immiscible liquids having limited mutual solubility in one another. Thus, the present process may be employed for reacting a gas stream with a liquid stream. Furthermore, the contacting of the immiscible fluids does not have to involve a reaction. Accordingly, the present process may be employed for the rapid mixing of two immiscible streams wherein it is desired to extract a component from one stream into the other, and the dissolution up to the limit of solubility of a gas stream within a liquid stream in a rapid, efficient manner.

Obviously, many modifications and variations of the invention as hereinabove set forth can be made without departing from the spirit and scope thereof; and therefore only such limitations should be imposed as are indicated in the appended claims.

I claim:

1. A continuous method for contacting fluids which comprises injecting under pressure a first fluid stream in the form of a substantially central core into an elongated contacting zone such that the periphery of said core together with a portion of said contacting zone define an annulus disposed in a parallel, coaxial relationship with respect to said core, and introducing under pressure into said annulus a second fluid stream which is substantially immiscible with said first fluid stream such that said first and second fluid streams pass through said contacting zone as separate, contacting, immiscible phases, said immiscible phases exhibiting a substantial absence of intermixing therebetween as they pass through said contacting zone.

2. A method of claim 1 wherein said first fluid stream is passed through said contacting zone at a velocity of between about 10 and about 100 feet per second and said second fluid stream is passed through said contacting zone at a velocity of between about 0.1 and about 10 feet per second.

3. The method of claim 1 wherein the length (L) of the contacting zone is between about 1 and about 100 times the diameter (D) of the contacting zone.

4. The method of claim 1 wherein the contact time between the two immiscible phases is between about 0.001 and about 0.1 second.

5. The method of claim 1 wherein the first stream comprises a sour hydrocarbon distillate, and the second stream comprises a caustic solution.

6. A method for sweetening a sour hydrocarbon distillate, which comprises injecting a stream of the sour distillate in the form of a substantially centrally disposed core into a contacting zone having a length (L) to diameter (D) ratio between about 1:1 and about 100:1 at a velocity of about 10 to about 100 feet per second, and introducing a caustic solution into said contacting zone in the form of annular-shape stream disposed coaxially about said distillate stream and in contact therewith at a velocity between about 0.1 and 10 feet per second, said distillate and caustic streams forming immiscible phases which exhibit a substantial absence of intermixing as said phases pass through said contacting zone.

References Cited

UNITED STATES PATENTS

| | | | |
|---|---|---|---|
| 2,273,104 | 2/1942 | Heilman | 196—32 |
| 2,740,747 | 4/1956 | Sweetser et al. | 196—28 |

DELBERT E. GANTZ, Primary Examiner

J. M. NELSON, Assistant Examiner

U.S. Cl. X.R.

23—1; 196—46